(12) United States Patent
Ku

(10) Patent No.: US 6,480,590 B1
(45) Date of Patent: Nov. 12, 2002

(54) NETWORK ACCESS PAY TELEPHONE, CONVERSION, AND METHOD

(76) Inventor: Li-Ta Ku, 6061 Woodfern Dr., Rancho Palos Verdes, CA (US) 90275

( * ) Notice: Subject to any disclaimer, the term of this patent is extended or adjusted under 35 U.S.C. 154(b) by 0 days.

(21) Appl. No.: 09/864,597

(22) Filed: May 23, 2001

(51) Int. Cl.$^7$ .............................................. H04M 17/00
(52) U.S. Cl. ............ 379/143; 379/144.04; 379/144.05; 379/144.08; 379/150
(58) Field of Search ...................... 379/433.01, 433.06, 379/433.07, 433.09, 440, 441, 442, 143, 144.01, 144.04, 144.05, 144.06, 144.07, 144.08, 146, 147, 148, 150, 151, 152, 153

(56) References Cited

U.S. PATENT DOCUMENTS

| | | | |
|---|---|---|---|
| 5,133,005 A | | 7/1992 | Kelley et al. |
| 5,168,518 A | * | 12/1992 | Criscenzo et al. ........... 379/145 |
| 5,425,088 A | * | 6/1995 | Dearkland ................... 379/143 |
| 5,430,797 A | * | 7/1995 | Hornsby ...................... 379/451 |
| 5,694,456 A | * | 12/1997 | Carter et al. ................ 379/143 |
| 5,701,338 A | * | 12/1997 | Leyen et al. ................ 379/155 |
| 6,047,054 A | | 4/2000 | Bayless |
| 6,047,173 A | * | 4/2000 | Leyen et al. ................ 379/155 |
| 6,163,598 A | | 12/2000 | Moore |
| 6,320,946 B1 | * | 11/2001 | Enzmann et al. ........... 379/143 |
| 6,370,242 B1 | * | 4/2002 | Speers et al. ............... 379/145 |

FOREIGN PATENT DOCUMENTS

WO   0062523   9/1999

OTHER PUBLICATIONS

"Bet you're wondering how I knew." brochure; Elcotel Telecommunications, Inc.; 5 pp.
"Everyone needs a reliable source." brochure; Elcotel Telecommunications, Inc.; 5 pp.
"Welcome to the 21$^{st}$ Century!" brochure; 2 pp.; 1997.
"Model 7000 Chassis" brochure; Protel Inc.; 4 pp.; 1999.
"Model 310 Chassis" brochure; by Protel Inc.; 4 pp.; 1999.
Ascension Payphones: brochure; by Protel Inc.; 4 pp.; 1999.
"Smarter Solution—Eclipse" brochure; Elcotel Telecommunications; 2 pp.
"Smarter Solution—Series 5" brochure; Elcotel Telecommunications; 2 pp.
"Set yourself apart" ad; Protel, Inc.; 1 pp.; 2000.
"Introducting eMillenium—The Evolution of Public Access" ad; QuorTech Solutions; 1 pp.
"Product News—Elcotel" magazine article; Perspectives; 1 pp.; 1999.
"ACC Quality Parts, Complete Stock, Competitive Prices, Immediate Delivery" ad; Arctic Communications Company; 1 pp;.

* cited by examiner

Primary Examiner—Rexford Barnie
(74) Attorney, Agent, or Firm—Sheldon & Mak

(57) ABSTRACT

A kit for converting an existing pay telephone to additionally provide computer network access includes an upper housing unit that latches to a lower housing of the existing telephone, and a network adapter unit which includes a network computer and a control module that selectively disables a hook switch connection to a payphone electronics module of the existing payphone. A coin scanner and an escrow unit of the existing payphone are connected through the control module to the payphone electronics unit. The network computer, in combination with the control module, provides a stand by mode, a pay phone mode, and a network mode. Also disclosed are a complete network access pay telephone and a method for converting the existing payphone to add network access.

26 Claims, 5 Drawing Sheets

NETWORK ACCESS PAY TELEPHONE, CONVERSION, AND METHOD

BACKGROUND

The present invention relates to telephonic communications, and more particularly to pay phones that provide for computer network access.

Over the past 100 years, the public telecommunications industry, which has produced and operated what are commonly known as "payphones," has evolved into one of the most easy-to-use and widely accepted communications networks. The core device in public communications, the payphone, literally has made "on the go" communications possible for millions of people daily. In recent years, however, unprecedented technological, competitive and regulatory changes within the telecommunications industry have created an equally unprecedented challenge for the public communications sector. A decade previously, the payphone was the only way most people on the go kept connected to home or office. Now, however, wireless phones keep everyone—from high school students to housewives to business travelers—in touch while on the go, talking on the phone while walking down the street or through a busy airport.

The Internet likewise has revolutionized communications by replacing cards and letters with e-mail, by replacing in-person shopping with e-commerce, and replacing traditional access to news, information and other services with personalized portals. As a result, consumers increasingly demand access to "content" anytime, anywhere, and not just to the voice communications conventionally provided by landlines and wireless phones. Content equals information that includes voice calls, local news, mapped directions, investment updates, e-commerce transactions, email, and connectivity with the home, office and other webbased information.

Thus the single-function payphone is being driven toward a phase-out condition, and Internet kiosks are appearing in public places for use by those not having ready access to the Internet. Such persons include those not having a personal computer and/or an account with an Internet service provider (ISP). Also, many who have such accounts may wish to access the Internet while away from their home or office and, even if they are carrying a portable computer equipped for Internet access there may not be an available direct telephone line. Internet kiosks are relatively expensive to install when the required space is taken into account. Consequently, they are often installed in spaces previously occupied by pay telephones, which tends to diminish revenue otherwise received from pay telephone service, as well as to generate public dissatisfaction with reduced pay phone availability. As a result, pay phones are now marketed that provide Internet access in addition to conventional voice communication capability. However, these new pay phones are excessively expensive.

Thus there is a need for an inexpensive way to provide public computer network access without discontinuing pay telephone service at existing locations.

SUMMARY

The present invention meets this need by providing a network pay telephone that can be easily converted from a preexisting conventional pay telephone and includes a significant portion of the preexisting telephone, the inventive pay telephone being operable for both network and conventional voice communications. In one aspect of the invention, a network access pay telephone includes a lower housing structure having a coin scanner, and escrow unit, and a payphone electronics module mounted therein, the payphone electronics module having a line receptacle for connecting an external telephone line, a coin scanner socket for electrically connecting the coin scanner, an escrow unit socket for electrically connecting the escrow unit, and an interface cable for electrically connecting an external interface, the payphone electronics module having circuitry for managing the conventional voice communications over the external telephone line in response to the coin scanner, the escrow unit, and the interface module; a front-end interface having an interface socket for electrically connecting the interface cable of the payphone electronics module; an upper housing structure having a handset connected to the front-end interface, a hook-switch connected to the front-end interface, and a dialpad connected to the front-end interface; a network computer comprising non-volatile memory, a modem having a pass-through connection to the line receptacle of the payphone electronics module, a display, an input device, and a local interface port, the display and the input device being supported by the upper housing structure for operator access thereto; and a control module connected to the local interface port and to the front-end interface, the control module also having pass-through connections between the coin scanner and the payphone electronics module and between the escrow unit and the payphone electronics module. Since the payphone electronics module can be a preexisting relatively expensive component of a conventional pay telephone, the inventive telephone can advantageously utilize such a device from inventory stock, or from a preexisting telephone. The input device can include a pointing device, which can include a trackball. The input device preferably includes an alphanumeric keyboard that is supported by the upper housing structure for user access, either alone or as a second input device.

The network pay telephone can include a function keypad for signaling operator selections to the network computer, and/or a card reader for signaling machine-readable data to the network computer. The network computer can further include an audio output circuit, the telephone also having a speaker connected to the audio output circuit for sounding previously stored messages.

The network computer is preferably operative for providing a plurality of modes, including a stand by mode wherein the display is activated to show introductory information; a payphone mode wherein the display is activated initially to show dialing instructions upon an off-hook condition of the hook switch; and a network mode wherein the display is activated, in response to predetermined operator input other than the off-hook condition, to show further operator input options and responses thereto. The payphone mode is preferably disabled during the network mode for preventing inadvertent termination of a network operation. Preferably the stand by mode is entered upon termination of either the payphone mode or the network mode for resuming display of the introductory information.

In another aspect of the invention, a kit for converting an existing pay telephone for network access as well as for conventional voice communications, includes an upper housing structure comprising a front-end interface, a handset, a hook-switch, and a dialpad connected to the front-end interface, which has an interface socket for electrically connecting the interface cable of a payphone electronics module of the preexisting pay telephone, the electronics module being mounted in a lower housing structure having a coin scanner, and an escrow unit, and a payphone electronics module mounted therein, the payphone electronics module having a line receptacle for connecting an external telephone line, a coin scanner socket for electrically connecting the coin scanner, an escrow unit socket for electrically connecting the escrow unit; a network computer having non-volatile memory, a modem having a pass-through connection for connecting to the line receptacle of the payphone electronics module, a display, an input device, and a local interface port, the display and the input device being supported by the upper housing structure for operator access thereto; and a control module connected to the local interface port and to the front-end interface, the control module also having pass-through connections for connecting between the coin scanner and the payphone electronics module and between the escrow unit and the payphone electronics module.

In a further aspect of the invention, a method for converting the existing pay telephone for adding network access includes:

(a) providing an upper housing structure comprising a front-end interface having an interface socket, a handset connected to the front-end interface, a hook-switch connected to the front-end interface, and a dialpad connected to the front-end interface;

(b) providing a network computer comprising non-volatile memory, a modem having a modem line connection, a display, an input device, and a local interface port;

(c) mounting the display and the input device to the upper housing structure for operator access thereto;

(d) providing a control module having respective coin scanner and escrow unit pass-through connections;

(e) electrically connecting the coin scanner to the control module and to the coin scanner socket of the payphone electronics module for passing signals from the coin scanner to the network computer and to the payphone electronics module;

(f) electrically connecting the escrow unit to the control module and to the escrow unit socket of the payphone electronics module for selectively activating the escrow unit in response to the network computer and the payphone electronics module;

(g) electrically connecting the interface cable of the payphone electronics module to the interface socket of the front-end interface for signaling the payphone electronics module in response to the hook switch and the dialpad, and for bidirectionally signaling between the handset and the payphone electronics module;

(h) electrically connecting the control module to the local interface port of the network computer and to the front-end interface for signaling the network computer in response to the hook switch;

(i) connecting the modem line connection to the payphone line receptacle of the payphone electronics module; and (j) latching the upper housing structure to the lower housing structure. The method can also include mounting the alphanumeric keyboard of the network computer to the upper housing structure for operator access thereto.

DRAWINGS

These and other features, aspects, and advantages of the present invention will become better understood with reference to the following description, appended claims, and accompanying drawings, where:

FIG. 7 is a flow chart showing operation of the network access payphone of FIG. 2.

DESCRIPTION

Figure 1:
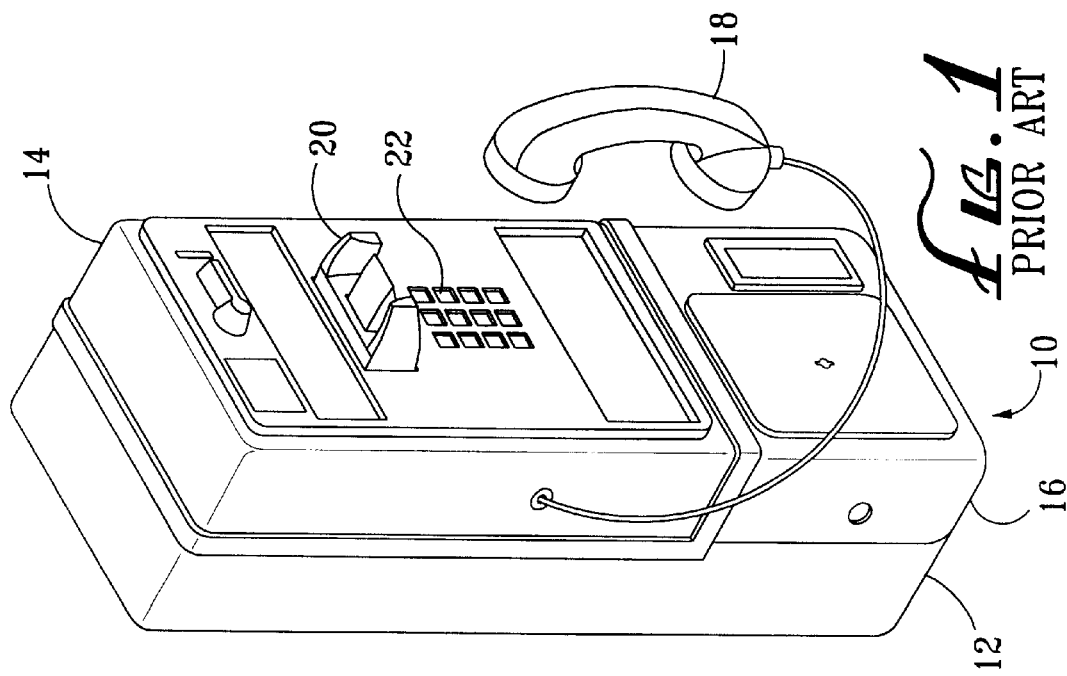
FIG. 1 is a perspective view of a prior art pay telephone.
Figure 5:
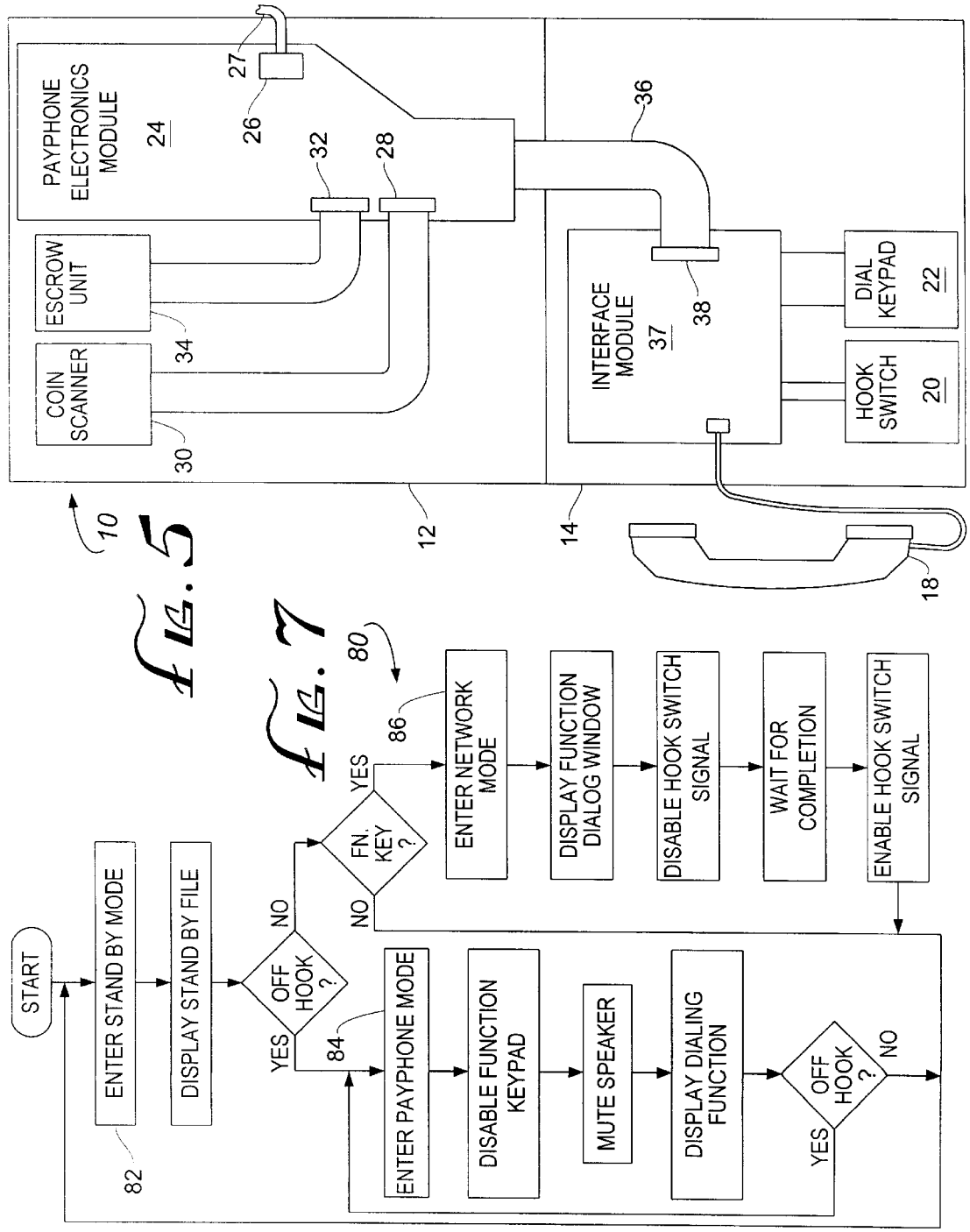
FIG. 5 is a pictorial block diagram of the prior art pay phone of FIG. 1.

The present invention is directed to a pay telephone that provides access to a computer network in addition to ordinary voice communications, that is particularly effective and easy to use, and that can be implemented as a conversion of existing pay telephones, incorporating substantial components therof. With reference to FIGS. 1 and 5 of the drawings, a conventional prior art coin-operated pay telephone 10 includes a rear or lower housing 12 having an upper housing 14 securely latched thereto, and a coin receptacle unit 16 that is also secured to the lower housing 12. A handset 18 is tethered to the upper housing 14, which also supports a hook-switch 20 and a dial keypad 22. As shown in FIG. 5, a conventional payphone electronics module 24 is mounted within the lower housing 12, the module 24 having a line receptacle 26 for connecting an external telephone line 27, a coin scanner socket 28 to which is connected a coin scanner 30, an escrow unit socket 32 to which is connected an escrow unit 34, and an interface cable 36. The upper housing 14 supports an interface module 37 having an interface socket 38 for receiving the interface cable 36 of the payphone electronics module. The handset 18, the hook switch 20, and the dial keypad 22 are electrically connected to the interface module 37, and to the payphone electronics module 24 through the interface cable 36.

According to the present invention, and with reference to FIGS. 2, 3, 6 and 7, a network access pay telephone 40 includes the lower housing 12, the coin receptacle unit 16, the payphone electronics module 24, the coin scanner 30, and the escrow unit 34, which can be unmodified components of the conventional pay telephone 10 of FIGS. 1 and 5. The inventive pay telephone 40 also includes a counterpart of the upper housing, designated 14', having counterparts of the handset 18 and the dial keypad 22 attached thereto in a manner corresponding to the above-described conventional pay telephone 10. A counterpart of the hook switch, designated 20', corresponds to the hook switch 20 but preferably incorporates a two-pole switch element for electrical isolation of added circuit elements from circuitry of the payphone electronics module. The upper housing 14' also supports a counterpart of the interface module, designated front-end interface 42, having a counterpart of the interface socket 38, the handset 18, the hook switch 20, with the dial keypad 22 also being electrically connected to the front-end interface 42. Also mounted to the upper housing 14' (but not necessarily required) are a function keypad 44 and a card reader 46 for sensing machine-readable data from a credit card or other device (not shown) that may be possessed by a user of the pay telephone 40, the function keypad 44 and the card reader 46 being electrically connected to the front-end interface 42.

Figure 3:
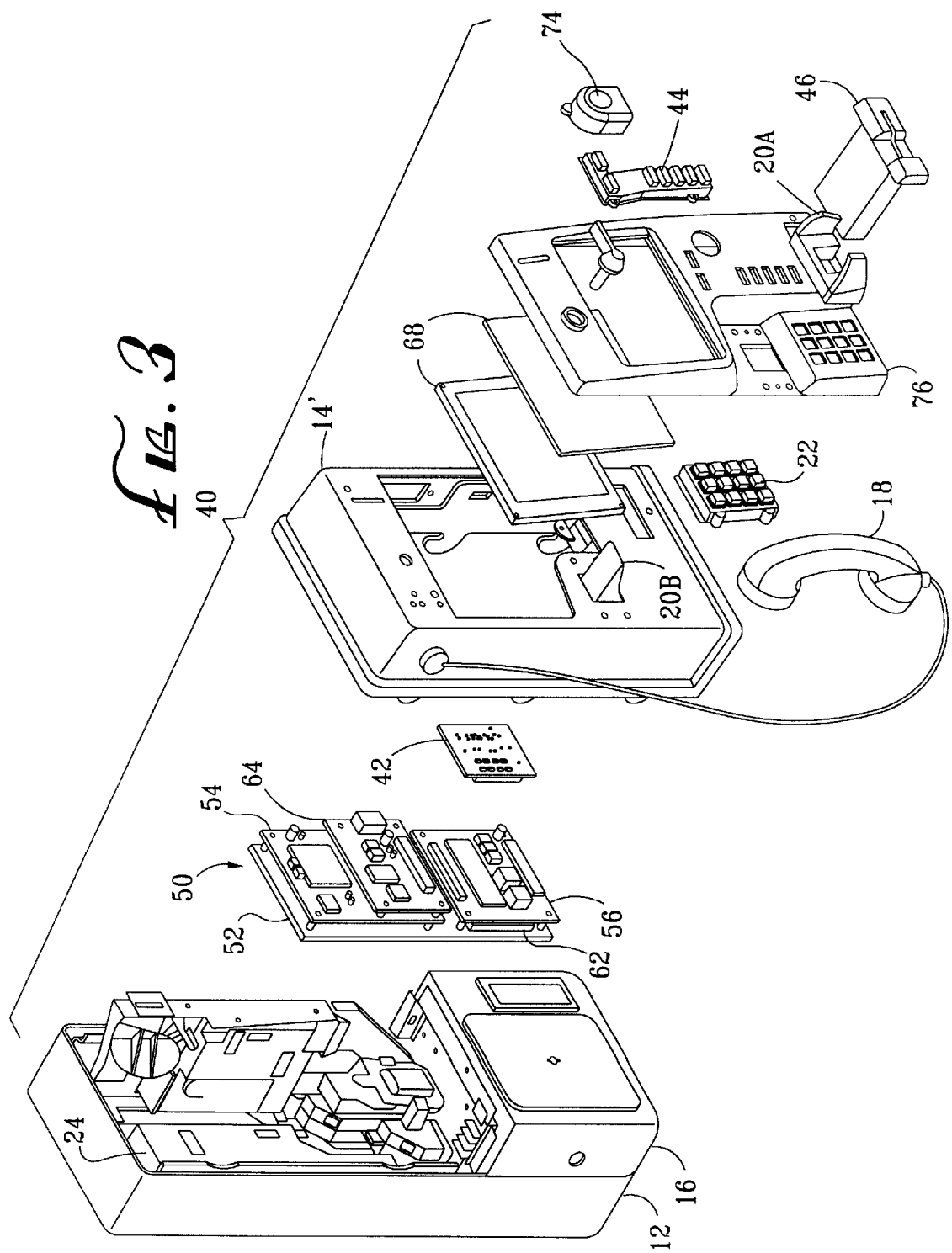
FIG. 3 is an exploded view of the network access pay telephone of FIG. 2.
Figure 6:
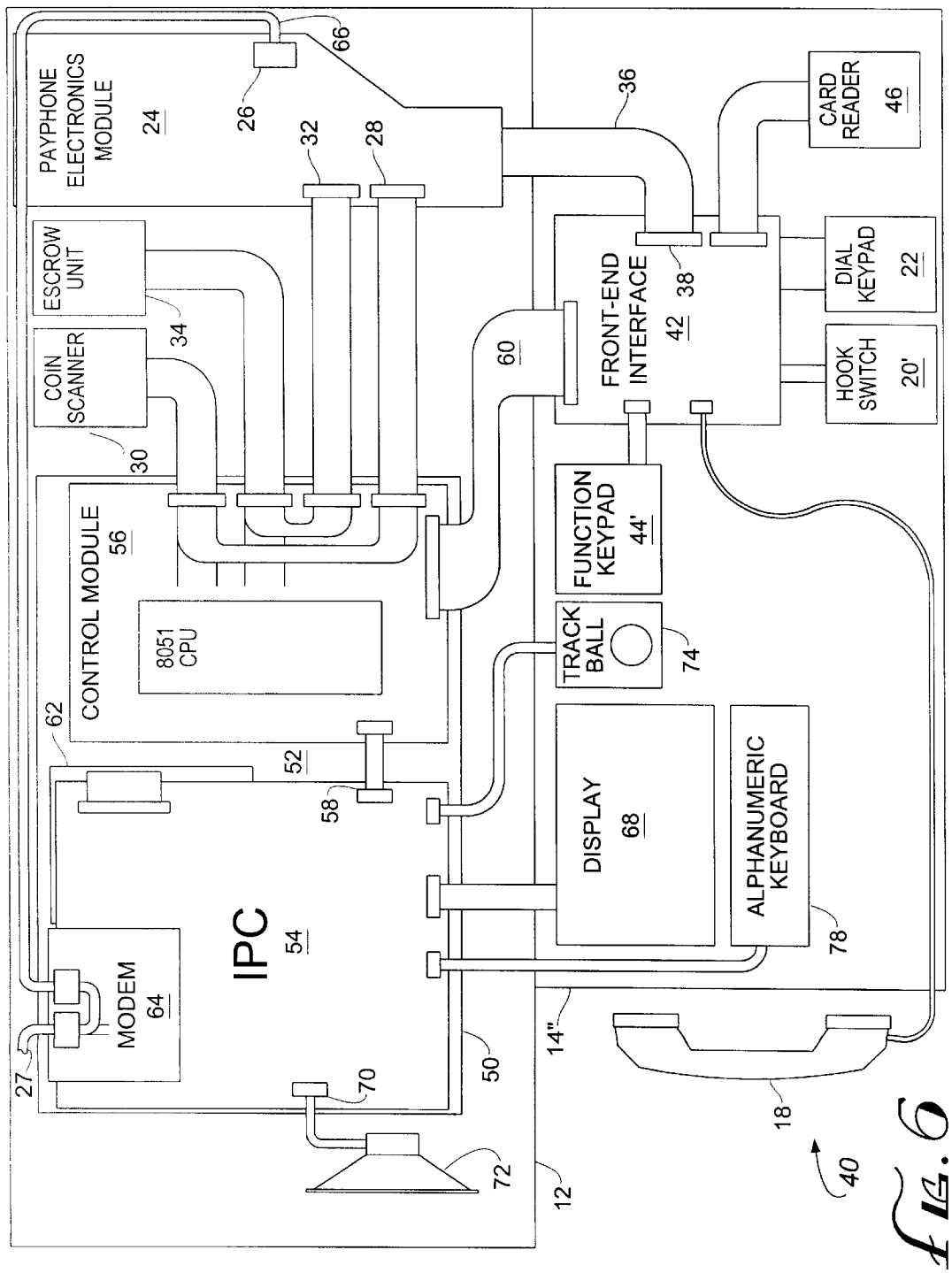
FIG. 6 is a pictorial block diagram of the network access payphone of FIG. 2.

The inventive pay telephone 40 also includes a network adapter unit 50 having a mounting base 52 as shown in FIG. 3 and including an Industrial Personal Computer (IPC) 54 and a control module 56 that is connected to a local (serial) interface port 58 of the IPC as shown in FIG. 6, a control cable 60 connecting the control module 56 to the front-end interface 42. The IPC 54 also has non-volatile memory which can include a conventional hard disk drive 62, a modem 64 including a pass-through telephone line connection 66 in the form of a modular socket pair, an LCD panel display 68, an audio circuit output 70 having a speaker 72 connected thereto, and a pointing input device in the form of a trackball 74. In the exploded view of FIG. 3, the hook switch 20' is shown separated as a hook 20A and a switch actuator 20B, the LCD panel display 68 is combined with a protective cover, and the upper housing 14' has a front bezel cover 76. Other conventional components of the network pay telephone 40, such as a coin chute, coin release, housing latch, etc., are not shown or described in detail.

Figure 2:
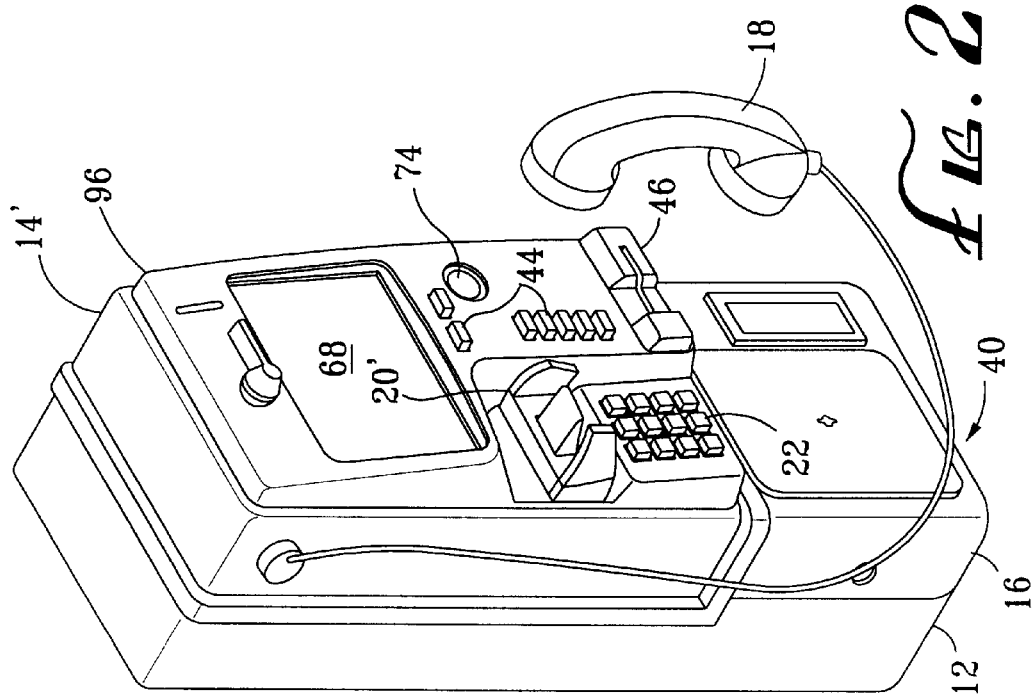
FIG. 2 is a perspective view as in FIG. 1, showing a network access pay telephone according to the present invention.
Figure 4:
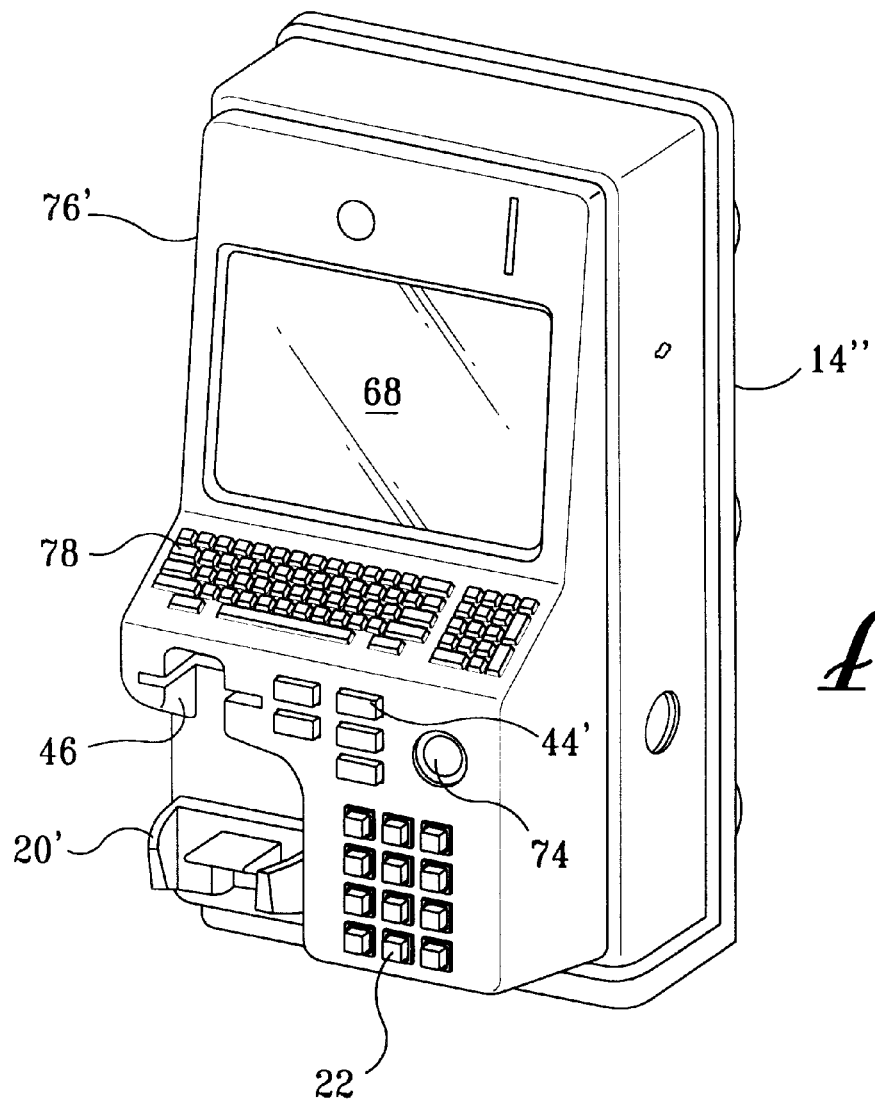
FIG. 4 is a perspective view as in FIG. 2, showing an alternative configuration of the network access pay telephone.

With further reference to FIG. 4, an alternative and preferred configuration of the upper housing, designated 14", has an alternatively configured bezel cover, designated 76', that supports a sloping alphanumeric keyboard 78 below the LCD display 68, the hook switch 20', the dial keypad 22, the card reader 46 being suitably relocated. Also, a rearranged counterpart of the function keypad, designated 44', has a reduced key complement in view of the availability of the alphanumeric keyboard 78 for operator input, the function keys provided being those most desirable to be prominently accessible. The keyboard 78 can be configured in a conventional manner, with a conventional device driver associated therewith in the IPC 54, except that some or all of conventional function keys (F1–F12, and the scroll-lock key) are omitted or disabled for preventing unauthorized user termination of application programs of the IPC. Thus it is possible to omit all of the function keys from the keyboard 68, with provision for a very limited subset thereof such as "Help" (F1) to be activated from the function keypad 44'. It will be understood that the block diagram of FIG. 5 includes the alphanumeric keyboard 78, which plugs into the IPC 54, the keyboard 78 being omitted in the configuration of the pay phone 40 that is shown in FIGS. 2 and 3.

A microcomputer implementation suitable for use as the IPC 54 is available as model Gene-4310 from Aaeon Technology, Inc., of Hsin-Tien City, Taipei, Taiwan. A modem board suitable for use as the modem 64 is available as PCM-5600, also from Aaeon Technology. A 6.4 inch LCD display suitable for use as the LCD panel display 68 is available as 6.4" TFT-LCD from Prime View International Co., Ltd., of Science-Based Industrial Park, Shinchu, Taiwan.

Operation of the network access pay telephone may be better understood with reference to FIG. 7, which shows a multiple mode process 80 having a stand by mode 82 wherein the LCD panel display 68 is activated to show a previously stored presentation, such a series of advertisements, in which audio messages are preferably played on the speaker 72. In the stand by mode 82, the function keypad 44 (or 44') is enabled and the hook switch 20' is repetitively tested for either an off-hook condition, which results in entry of a payphone mode 84; otherwise, a network mode 86 is entered upon detected activation of any key of the the function keypad 44. In the payphone mode, the function keypad 44 is disabled, the speaker 72 is muted, and the display is activated with conventional dialing instructions. In the network mode 86, the display 68 is activated with a dialog window corresponding to the particular key of the function keypad 44 that was pressed, and signals from the hook switch to the payphone electronics module 24 are disabled. When the activated function is completed (such as by user activation of a "Quit" function from the trackball 74 or an assigned function key), the hook switch signal to the payphone electronics module 24 is restored and control is passed to the stand by mode 82.

During the payphone mode 84, repetitive testing of the hook switch 20' is continued with the payphone electronics module 24 operating in a conventional manner until an on-hook condition is detected, upon which control is returned to the stand by mode (with re-enabling of the function keypad 44).

Although the present invention has been described in considerable detail with reference to certain preferred versions thereof, other versions are possible. Therefore, the spirit and scope of the appended claims should not necessarily be limited to the description of the preferred versions contained herein.

What is claimed is:

1. A network access pay telephone for accessing a digital communications network as well as for conventional voice communications, comprising:

(a) a lower housing structure having a coin. scanner, and escrow unit, and a payphone electronics module mounted therein, the payphone electronics module having a line receptacle for connecting an external telephone line, a coin scanner socket for electrically connecting the coin scanner, an escrow unit socket for electrically connecting the escrow unit, and an interface cable for electrically connecting an external interface, the payphone electronics module having circuitry for managing the conventional voice communications over the external telephone line in response to the coin scanner, the escrow unit, and the interface module;

(b) a front-end interface having an interface socket for electrically connecting the interface cable of the payphone electronics module;

(c) an upper housing structure having a handset connected to the front-end interface, a hook-switch connected to the front-end interface, and a dialpad connected to the front-end interface;

(d) a network computer comprising non-volatile memory, a modem having a pass-through connection to the line receptacle of the payphone electronics module, a display, an input device, and a local interface port, the display and the input device being supported by the upper housing structure for operator access thereto; and (e) a control module connected to the local interface port and to the front-end interface, the control module also having pass-through connections between the coin scanner and the payphone electronics module and between the escrow unit and the payphone electronics module.

2. The network access pay telephone of claim 1, wherein the input device comprises a pointing device.

3. The network access pay telephone of claim 2, wherein the pointing device comprises a trackball.

4. The network access pay telephone of claim 2, wherein the input device is a first input device, the network computer further comprising a second input device being an alphanumeric keyboard supported by the upper housing structure.

5. The network access pay telephone of claim 1, wherein the input device comprises an alphanumeric keyboard supported by the upper housing structure.

6. The network access pay telephone of claim 1, further comprising a function keypad for signaling operator selections to the network computer.

7. The network access pay telephone of claim 1, further comprising a card reader for signaling machine-readable data to the network computer.

8. The network access pay telephone of claim 1, wherein the network computer further comprises an audio output circuit, the telephone further comprising a speaker connected to the audio output circuit.

9. The network access pay telephone of claim 1, wherein the network computer is operative in a plurality of modes, comprising:

(a) a stand by mode wherein the display is activated to show introductory information;

(b) upon an off-hook condition of the hook switch, a payphone mode wherein the display is activated initially to show dialing instructions; and (c) in response to predetermined operator input other than the off-hook condition, a network mode wherein the display is activated to show further operator input options and responses thereto.

10. The network access pay telephone of claim 9, wherein the payphone mode is disabled during the network mode.

11. The network access pay telephone of claim 9, wherein the network mode is disabled during the payphone mode.

12. The network access pay telephone of claim 9, wherein the stand by mode is entered upon termination of the payphone mode and the network mode.

13. A kit for converting an existing pay telephone to a network access pay telephone for accessing a digital communications network as well as for conventional voice communications, the existing pay telephone comprising a lower housing structure having a coin scanner, and escrow unit, and a payphone electronics module mounted therein, the payphone electronics module having a line receptacle for connecting an external telephone line, a coin scanner socket for electrically connecting the coin scanner, an escrow unit socket for electrically connecting the escrow unit, and an interface cable for electrically connecting an external interface, the payphone electronics module having circuitry for managing the conventional voice communications over the external telephone line in response to the coin scanner, the escrow unit, and the external interface, the kit comprising:

(a) an upper housing structure comprising a front-end interface having an interface socket for electrically connecting the interface cable of the payphone electronics module, a handset connected to the front-end interface, a hook-switch connected to the front-end interface, and a dialpad connected to the front-end interface;

(b) a network computer comprising non-volatile memory, a modem having a pass-through connection for connecting to the line receptacle of the payphone electronics module, a display, an input device, and a local interface port, the display and the input device being supported by the upper housing structure for operator access thereto; and (c) a control module connected to the local interface port and to the front-end interface, the control module also having pass-through connections for connecting between the coin scanner and the payphone electronics module and between the escrow unit and the payphone electronics module.

14. The kit of claim 13, wherein the input device comprises a pointing device.

15. The kit of claim 14, wherein the pointing device comprises a trackball.

16. The kit of claim 14, wherein the input device is a first input device, the network computer further comprising a second input device being an alphanumeric keyboard supported by the upper housing structure.

17. The kit of claim 13, wherein the input device comprises an alphanumeric keyboard supported by the upper housing structure.

18. The kit of claim 13, further comprising a function keypad for signaling operator selections to the network computer.

19. The kit of claim 13, further comprising a card reader for signaling machine-readable data to the network computer.

20. The kit of claim 13, wherein the network computer further comprises an audio output circuit, the telephone further comprising a speaker connected to the audio output circuit.

21. The kit of claim 13, wherein the network computer is operative in a plurality of modes, comprising:

(a) a stand by mode wherein the display is activated to show introductory information;

(b) upon an off-hook condition of the hook switch, a payphone mode wherein the display is activated initially to show dialing instructions; and (c) in response to predetermined operator input other than the off-hook condition, a network mode wherein the display is activated to show further operator input options and responses thereto.

22. The kit of claim 21, wherein the payphone mode is disabled during the network mode.

23. The kit of claim 21, wherein the network mode is disabled during the payphone mode.

24. The kit of claim 21, wherein the stand by mode is entered upon termination of the payphone mode and the network mode.

25. A method for converting an existing pay telephone to a network access pay telephone for accessing a digital communications network as well as for conventional voice communications, the existing pay telephone comprising a lower housing structure having a coin scanner, and escrow unit, and a payphone electronics module mounted therein, the payphone electronics module having a payphone line receptacle for connecting an external telephone line, a coin scanner socket for electrically connecting the coin scanner, an escrow unit socket for electrically connecting the escrow unit, and an interface cable connected to an interface module, the payphone electronics module having circuitry for managing the conventional voice communications over the external telephone line in response to the coin scanner, the escrow unit, and the external interface, the method comprising:

(a) providing an upper housing structure comprising a front-end interface having an interface socket, a handset connected to the front-end interface, a hook-switch connected to the front-end interface, and a dialpad connected to the front-end interface;

(b) providing a network computer comprising non-volatile memory, a modem having a modem line connection, a display, an input device, and a local interface port;

(c) mounting the display and the input device to the upper housing structure for operator access thereto;

(d) providing a control module having respective coin scanner and escrow unit pass-through connections;

(e) electrically connecting the coin scanner to the control module and to the coin scanner socket of the payphone electronics module for passing signals from the coin scanner to the network computer and to the payphone electronics module;

(f) electrically connecting the escrow unit to the control module and to the escrow unit socket of the payphone electronics module for selectively activating the escrow unit in response to the network computer and the payphone electronics module;

(g) electrically connecting the interface cable of the payphone electronics module to the interface socket of the front-end interface for signaling the payphone electronics module in response to the hook switch and the dialpad, and for bidirectionally signaling between the handset and the payphone electronics module;

(h) electrically connecting the control module to the local interface port of the network computer and to the front-end interface for signaling the network computer in response to the hook switch;

(i) connecting the modem line connection to the payphone line receptacle of the payphone electronics module; and (j) latching the upper housing structure to the lower housing structure.

26. The method of claim 25, wherein the network computer further comprises an alphanumeric keyboard, the method further comprising mounting the alphanumeric keyboard to the upper housing structure for operator access thereto.

* * * * *